United States Patent
Kim

(10) Patent No.: US 10,307,912 B2
(45) Date of Patent: Jun. 4, 2019

(54) ROBOT CLEANER AND METHOD FOR AUTO-CORRECTING 3D SENSOR OF THE ROBOT CLEANER

(71) Applicant: LG ELECTRONICS INC., Seoul (KR)

(72) Inventor: Yeonsoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 564 days.

(21) Appl. No.: 14/904,401

(22) PCT Filed: Jul. 15, 2013

(86) PCT No.: PCT/KR2013/006302
§ 371 (c)(1),
(2) Date: Jan. 11, 2016

(87) PCT Pub. No.: WO2015/008874
PCT Pub. Date: Jan. 22, 2015

(65) Prior Publication Data
US 2016/0144512 A1   May 26, 2016

(51) Int. Cl.
*A47L 9/00* (2006.01)
*B25J 9/16* (2006.01)
(Continued)

(52) U.S. Cl.
CPC ......... *B25J 11/0085* (2013.01); *A47L 9/009* (2013.01); *B25J 9/1674* (2013.01); *B25J 9/1694* (2013.01);
(Continued)

(58) Field of Classification Search
CPC .. A47L 9/009; A47L 2201/02; A47L 2201/04; B25J 9/1674; B25J 9/1694;
(Continued)

(56) References Cited

U.S. PATENT DOCUMENTS

2002/0153184 A1   10/2002   Song et al.
2004/0088080 A1   5/2004   Song et al.
(Continued)

FOREIGN PATENT DOCUMENTS

JP          2004-148088 A    5/2004
KR     10-2002-0081035 A   10/2002
(Continued)

OTHER PUBLICATIONS

International Search Report dated Apr. 28, 2014 issued in Application No. PCT/KR2013/006302 (with English Translation).

*Primary Examiner* — Spencer D Patton
(74) *Attorney, Agent, or Firm* — KED & Associates LLP

(57) ABSTRACT

A robot cleaner includes a 3D sensor unit installed on a main body to sense nearby objects and output sensing information; a secondary sensor unit configured to sense nearby objects and output sensing information; a storage unit configured to set a diagnostic algorithm according to a diagnostic mode in advance; an input unit configured to input an execution command for the diagnostic mode; a control unit configured to auto-correct the diagnostic mode for the 3D sensor and a parameter of the 3D sensor unit using the diagnostic algorithm in response to the execution command; and an output unit configured to output an execution result of the diagnostic mode and a correction message.

14 Claims, 8 Drawing Sheets

(51) Int. Cl.
    *G05D 1/02*     (2006.01)
    *G06T 7/60*     (2017.01)
    *B25J 11/00*     (2006.01)
    *G06T 7/80*     (2017.01)
    *G06T 7/521*     (2017.01)
    *H04N 13/254*     (2018.01)
    *H04N 13/246*     (2018.01)
    *H04N 13/271*     (2018.01)

(52) U.S. Cl.
    CPC ............ *B25J 9/1697* (2013.01); *G05D 1/024* (2013.01); *G05D 1/0248* (2013.01); *G06T 7/521* (2017.01); *G06T 7/80* (2017.01); *H04N 13/246* (2018.05); *H04N 13/254* (2018.05); *H04N 13/271* (2018.05); *A47L 2201/02* (2013.01); *A47L 2201/04* (2013.01); *G05D 2201/0203* (2013.01); *G06T 2207/30252* (2013.01); *Y10S 901/01* (2013.01)

(58) Field of Classification Search
    CPC ..... B25J 9/1697; B25J 11/0085; G05D 1/024; G05D 1/0248; G05D 2201/0203; G05D 2201/00–2201/0218; G06T 7/521; G06T 7/80; G06T 2207/30252; H04N 13/246; H04N 13/254; H04N 13/271; Y10S 901/01

See application file for complete search history.

(56) References Cited

U.S. PATENT DOCUMENTS

| | | | |
|---|---|---|---|
| 2006/0023938 A1* | 2/2006 | Ban | B25J 9/1692 382/153 |
| 2007/0100501 A1 | 5/2007 | Im et al. | |
| 2007/0247614 A1* | 10/2007 | Puah | G01N 21/95684 356/73 |
| 2013/0010079 A1* | 1/2013 | Zhang | G06T 7/85 348/47 |
| 2014/0184751 A1* | 7/2014 | Liou | H04N 13/239 348/47 |
| 2015/0362921 A1* | 12/2015 | Hanaoka | G01B 11/24 701/23 |

FOREIGN PATENT DOCUMENTS

| | | |
|---|---|---|
| KR | 10-2007-0045475 A | 5/2007 |
| KR | 10-2012-0116278 A | 10/2012 |
| KR | 10-2013-0000278 A | 1/2013 |

\* cited by examiner (a)

(b)

(c)

(d)

(a) (b) (c)

(a) (b) (c)

ROBOT CLEANER AND METHOD FOR AUTO-CORRECTING 3D SENSOR OF THE ROBOT CLEANER

CROSS-REFERENCE TO RELATED PATENT APPLICATION

This application is a U.S. National Stage Application under 35 U.S.C. § 371 of PCT Application No. PCT/KR2013/006302, filed Jul. 15, 2013, whose entire disclosure is hereby incorporated by reference.

TECHNICAL FIELD

The present disclosure relates to a robot cleaner and a method for auto-correcting a 3D sensor of the robot cleaner.

BACKGROUND ART

In general, a robot has been developed for industry and has taken charge of a portion of factory automation. In recent, a field that applies the robot has been expanded, a medical robot, a space and aircraft robot, etc. have been developed, and a home robot that may be used at general home is also being made.

A representative example of the home robot is a robot cleaner, which is a kind of an electronic device that travels by itself on a region and sucks up ambient dust or foreign objects for cleaning. Since the robot cleaner generally includes a chargeable battery and an obstacle sensor that enables the robot cleaner to avoid obstacles while the robot cleaner travels, it is possible to travel by itself and perform cleaning.

Techniques for controlling the robot cleaner include using a remote control, a user interface or using a button on the main body of the robot cleaner.

In recent, applications using the robot cleaner are being developed. For example, as the development of the robot cleaner having a networking function has been performed, a function is being implemented which enables a cleaning command to be provided remotely or a home situation to be monitored. Also, robot cleaners are being developed which have functions of identifying their positions and making maps by using a camera or various sensors.

DISCLOSURE OF THE INVENTION

Technical Problem

Embodiments provide a robot cleaner or a method of automatically correcting a 3D sensor of the robot cleaner that may perform diagnosis and auto-correction on a 3D sensor in a main body upon initial actuation or according to a user need.

Technical Solution

In one embodiment, a robot cleaner includes a 3D sensor unit installed on a main body to sense nearby objects and output sensing information; a secondary sensor unit configured to sense nearby objects and output sensing information; a storage unit configured to set a diagnostic algorithm according to a diagnostic mode in advance; an input unit configured to input an execution command for the diagnostic mode; a control unit configured to auto-correct the diagnostic mode for the 3D sensor and a parameter of the 3D sensor unit using the diagnostic algorithm in response to the execution command; and an output unit configured to output an execution result of the diagnostic mode and a correction message.

The 3D sensor unit may include a laser module that irradiates a target with a laser pattern, and a camera module that obtains an image including the laser pattern.

In another embodiment, a method of automatically correcting a 3D sensor unit of a robot cleaner that includes the 3D sensor unit configured to sense nearby objects and output sensing information and includes a plurality of operation modes includes receiving an execution command for a diagnostic mode among the plurality of operation modes; actuating the 3D sensor unit according to the diagnostic mode when the execution command is received; and using the sensing information output from the 3D sensor unit to diagnose a state of the 3D sensor unit and perform auto-correction.

Advantageous Effects

Since embodiments of the present disclosure performs diagnosis and auto-correction on a 3D sensor unit upon initial actuation or according to a user need, it is possible to prevent troubles that may occur due to malfunction during cleaning or travel, it is possible to increase the operation efficiency of the robot cleaner, and it is possible to enhance the safety and convenience of a user.

MODE FOR CARRYING OUT THE INVENTION

Figure 1:
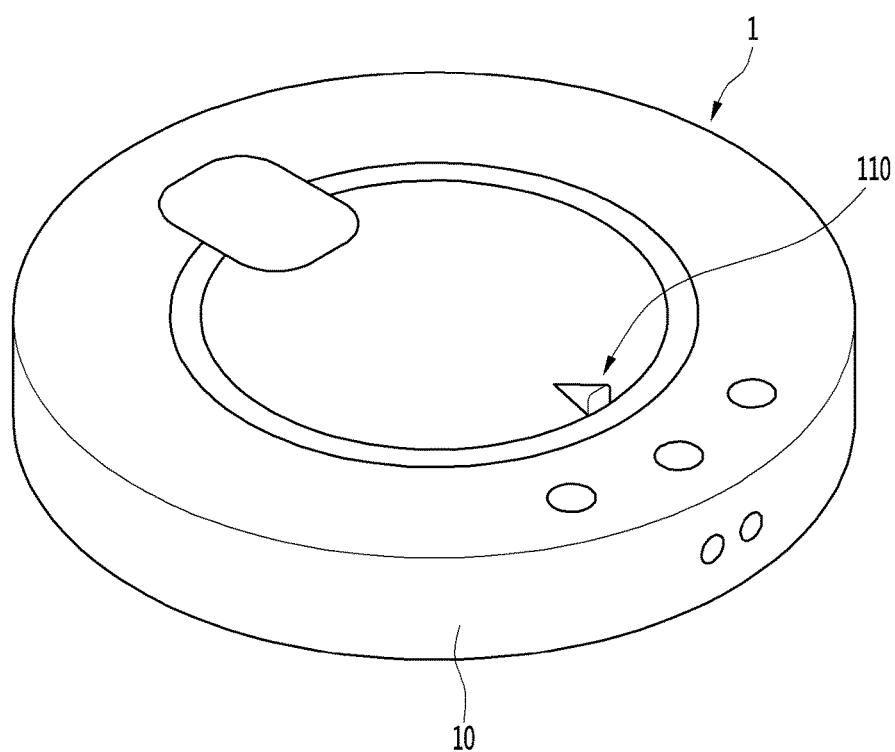
FIG. 1 is a perspective view of the exterior of a robot cleaner according to an embodiment.
Figure 2:
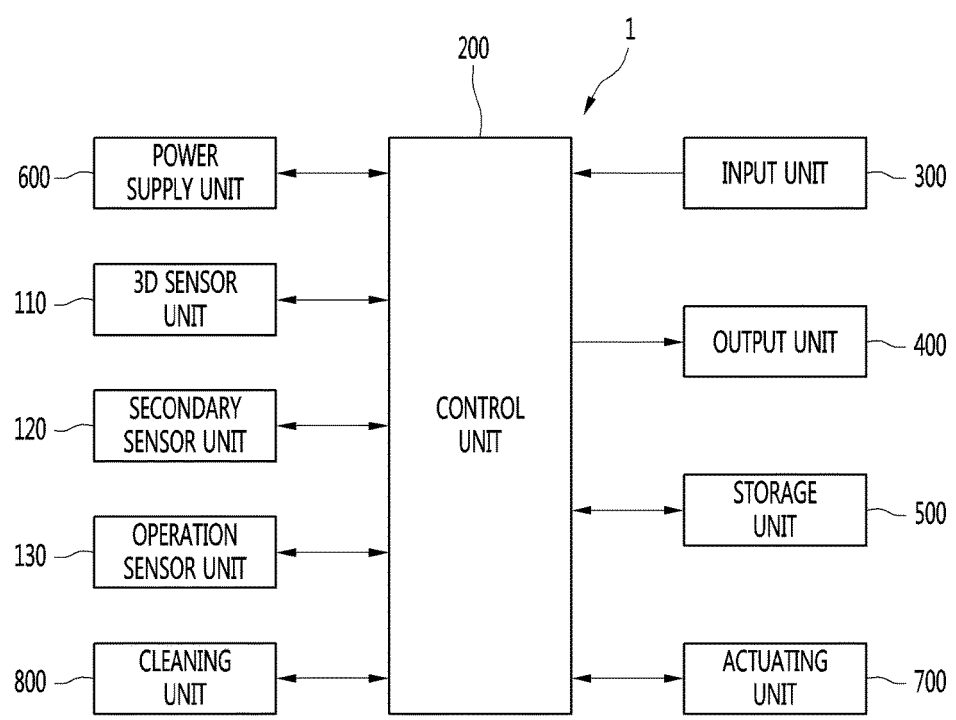
FIG. 2 is a block diagram of a robot cleaner according to an embodiment.

FIG. 1 is a perspective view of the exterior of a robot cleaner according to an embodiment, and FIG. 2 is a block diagram of a robot cleaner according to an embodiment.

Referring to FIGS. 1 and 2, the robot cleaner according to an embodiment may include a 3D sensor unit 110, a secondary sensor unit 120, a control unit 200, an input unit 300, an output unit 400, a storage unit 500, a power supply unit 600, an actuating unit 700, and a cleaning unit 800.

The 3D sensor unit 110 may be installed on a main body 10 of the robot cleaner 10 and sense nearby objects to output 3D sensing information. The secondary sensor unit 120 may be installed on the main body 10 and sense nearby objects to output sensing information. The input unit 300 may receive an execution command for a diagnostic mode on the 3D sensor unit 110. The control unit 200 may execute a diagnostic mode on the 3D sensor unit 110 by using a diagnostic algorithm according to the execution command, diagnose a state of the 3D sensor unit 110 by using the 3D sensing information, and auto-correct parameters of the 3D sensor unit 110 according to a result of the diagnosis. The output unit 400 may output an execution result of the diagnostic mode or error messages.

A control command may be input by a user directly to the robot cleaner through the input unit 300. Also, a command for outputting one or more of pieces of information stored in the storage unit 500 may be input by the user through the input unit 300. The input unit 300 may include one or more buttons. For example, the input unit 300 may include a 'CHECK' button and a 'SET' button. The 'CHECk' button inputs a command for checking sensing information, obstacle information, position information, a cleaning region or cleaning map. The 'SET' button inputs a command for setting information. The input unit 300 may include a 'RESET' button that inputs a command for resetting information, a 'REMOVE' button, a 'START' button, a 'STOP' button, etc. As another example, the input unit 300 may include a button for setting or removing reservation information. Also, the input unit 300 may further include a button that sets or changes a cleaning mode. Also, the input unit 300 may further include a button that obtains a command for restoring to a recharging base.

The input unit 300 is a hard key, soft key, touch pad, etc. and may be installed at an upper part of the robot cleaner. Also, the input unit 300 may be in the form of a touch screen along with the output unit 300. The input unit 300 obtains commands to start, end, stop, cancel, etc. a diagnostic mode for the 3D sensor unit 110. By pressing one of buttons installed on the robot cleaner, pressing buttons in a way, or pressing a single button for a time, a user may input a command for entering a diagnostic mode. As another example, by generating a control signal by using a remote control, a terminal, etc., a user may input the execution command for a diagnostic mode to the robot cleaner. In this case, the robot cleaner may further include a sensor or communication unit that receives the control signal. Also, the input unit 300 may set or obtain a diagnosis target, style, order, etc.

The output unit 400 may be installed at the upper part of the robot cleaner. The installation position or type may vary. For example, the output unit 400 may display reservation information, a battery state, a cleaning style or travel style, such as intensive cleaning, space expansion, zigzag operation, etc. The output unit 400 may output internal state information on the robot cleaner that is detected by the control unit 200, e.g., the current state of each unit configuring the robot cleaner and the current cleaning state. Also, the output unit 400 may display, on the display, external detection information, obstacle information, position information, a cleaning region, a cleaning map, etc. that are detected by the control unit 200. The output unit 400 may be formed as one of a light emitting diode (LED), a liquid crystal display (LCD), a plasma display panel, and an organic light emitting diode (OLED).

The output unit 400 may further include a sound output unit that outputs, through sound, the execution result of a diagnostic mode for the 3D sensor unit 110. For example, the output unit 400 may output a warning sound to the outside according to a warning signal. The sound output unit includes a unit that outputs a sound, such as a beeper, speaker, etc. The output unit 400 may output a diagnostic result to the outside by using audio information that is stored in the storage unit 500.

The storage unit 500 stores a diagnostic algorithm that is preset in order to execute the diagnostic mode for the 3D sensor unit 110. The storage unit 500 may store each diagnostic algorithm according to a diagnostic style for the 3D sensor unit 110 or pre-store all diagnostic algorithms. The storage unit 500 may store audio information for propagating the state of the robot cleaner, or the diagnostic result of the 3D sensor unit 110 to the outside. That is, the storage unit 500 may patternize and pre-store the state of the robot cleaner or the execution result of the diagnostic mode as a form of message data or sound data. The output unit 400 may include a signal processing unit to signal-process audio information stored in the storage unit 500 and output the processed information to the outside through the sound output unit.

The storage unit 500 may store a control program that controls (actuates) the robot cleaner, and corresponding data. The storage unit 500 may further store image information, obstacle information, position information, a cleaning region, a cleaning map, etc. in addition to audio information. Also, the storage unit 500 may store a cleaning style or travel style. The storage unit 500 mostly uses a nonvolatile memory (NVM). In this example, the NVM or NVRAM is a storage device that maintains stored information even when power is not supplied. The NVM includes a ROM, flash memory, a magnetic computer storage device (e.g., hard disk, disk drive, magnetic tape), optical driver, magnetic RAM, PRAM, etc.

The 3D sensor unit 110 may be installed at the front of the robot cleaner to take an image on the front of the robot cleaner that is moving.

The 3D sensor unit 110 may transmit the taken front image to the control unit 200. The control unit 200 converts the image received from the 3D sensor unit 110 into 3D image data to generate the 3D image data in a format. The generated 3D image data is stored in the storage unit 500.

The 3D sensor unit 110 may include a camera module 110a and a laser module 110b. The laser module 110b may be installed adjacent to the camera module 110a. The laser module 110b irradiates a front target taken by the camera module 110a, with a laser line. Thus, an image of the irradiated laser line is also included in an image of the target that is taken by the camera module 110a. The control unit 200 extracts the laser line image in the image obtained by the camera module 110a and determines the target by extracting the characteristic point of the target on a corresponding image.

Figure 3:
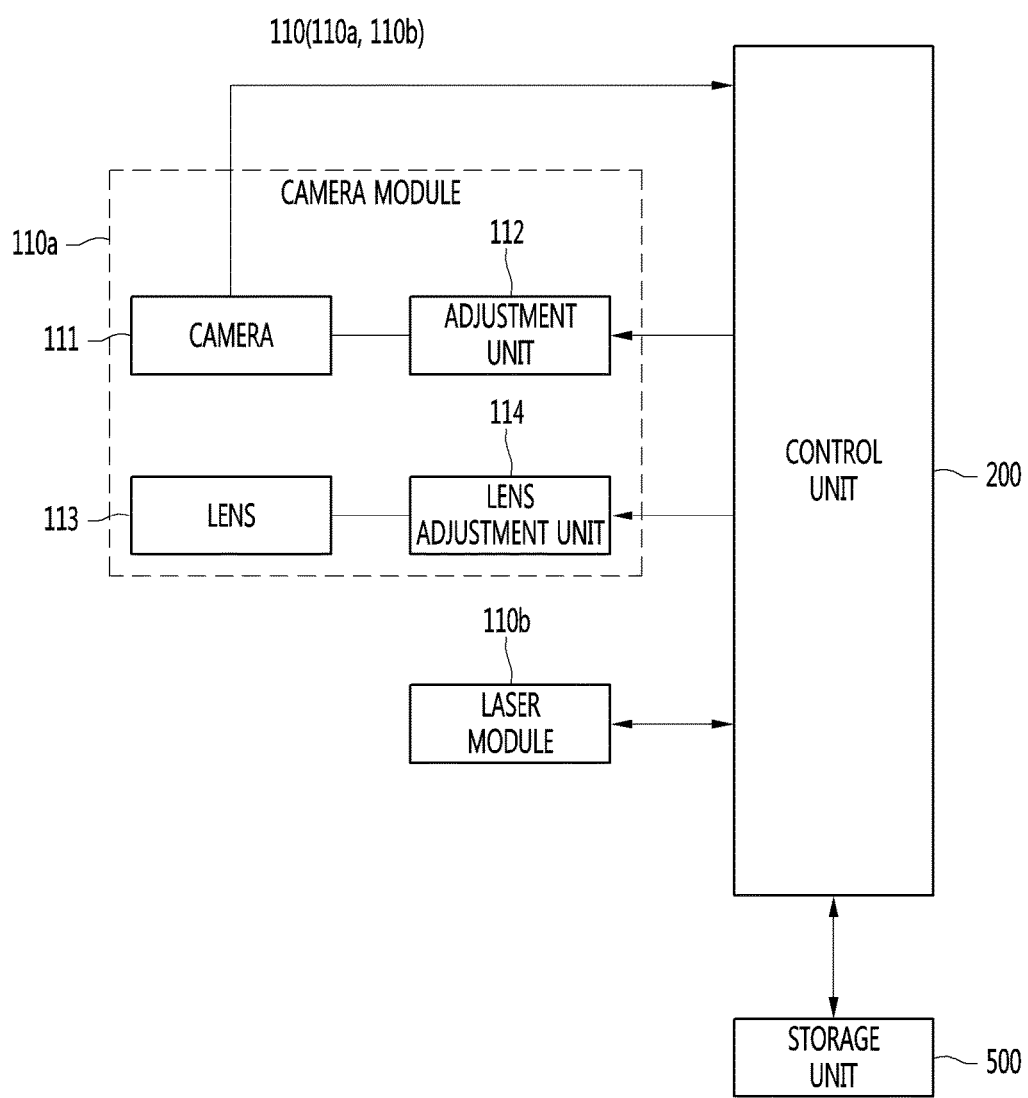
FIG. 3 is a diagram for explaining a camera module in a robot cleaner according to an embodiment.

FIG. 3 is a diagram for explaining a camera module in a robot cleaner according to an embodiment.

Referring to FIG. 3, the camera module 110a may include a camera 111, a lens 112 that is connected to the camera 111 to focus on the target, an adjustment unit 113 that adjusts the camera 111, and a lens adjustment unit 113 that adjusts the lens 112. The lens 112 may include a lens having a wide angle of view so that all regions near the camera, e.g., all regions before the camera may be taken at a position. For example, it is possible to include a lens whose angle of view is equal to or wider than an angle of view, e.g., 160□.

The 3D sensor unit 110 may sense an object that is present in a direction in which the robot cleaner moves, especially an obstacle and deliver detection information to the control unit 200. That is, the 3D sensor unit 110 may sense a protrusion, home stuff, furniture, a wall surface, a wall corner, etc. that are present in a path through which the robot cleaner moves, and deliver related information to the control unit 200.

Since the control unit 200 receives a signal or data from the 3D sensor unit 110, it is possible to diagnose the state of the 3D sensor unit 110. That is, the control unit 200 may diagnose whether the 3D sensor unit 110 start to take an image or the state of the 3D sensor unit 110 by using image data taken by the 3D sensor unit 110.

The 3D sensor unit 110 may take an image on the front on the move, in which case it may slightly incline toward the floor surface, and obtain an image of the front. For example, the 3D sensor unit 110 may be installed in such a manner the laser module 110b is installed on the main body 10 to slightly incline toward the floor surface so that the floor surface of a distance from the robot cleaner, e.g., a 30 cm therefrom is irradiated with a laser beam.

When the diagnostic mode for the 3D sensor unit 110 is executed, the control unit 200 compares a laser line image with which the target is irradiated due to the 3D sensor unit 110 irradiated with a laser beam, with a preset reference image, and diagnoses the 3D sensor unit 110 by using a result of the comparison. When in the diagnostic mode, there is a need for parameter auto-correction to the 3D sensor unit 110, the control unit 200 enables the robot cleaner to move toward a preset target according to an auto-correction algorithm and performs auto-correction on the 3D sensor unit 110 while maintaining a distance from the set target. When performing the diagnosis and auto-correction to the 3D sensor unit 110, the output unit 400 may output a voice message, such as "Diagnosis for the 3D sensor unit 110 is being performed" or "Auto-correction for the 3D sensor unit 110 is being performed" or display a message on the screen.

The secondary sensor unit 120 may include one or more of an external signal sensor, a first obstacle sensor (front sensor), a second obstacle sensor, a cliff sensor, a lower camera sensor, and an upper camera sensor.

The external signal sensor senses an external signal. The external signal sensor may include e.g., an infrared ray sensor, an ultrasonic sensor, a radio frequency (RF) sensor. The robot cleaner receives a guide signal generated by a recharging base by using the external signal sensor and checks the position and direction of the recharging base. The recharging base transmits a guide signal that indicates a direction and distance so that the robot cleaner may return. The robot cleaner receives a signal transmitted by the recharging base, determines the current position, sets a movement direction, and returns to the recharging base. Also, the robot cleaner senses a signal generated by a remote control device, such as a remote control, terminal, etc. by using the external signal sensor. The external signal sensor may be disposed at one of the inside or outside of the robot cleaner. The external signal sensor may be installed inside the robot sensor, e.g., under the output unit or near the upper camera sensor.

The first obstacle sensor (front sensor) may be installed at the front of the robot cleaner, e.g., an outer circumferential surface thereof at an interval. The front sensor senses an object, especially an obstacle that is present in a direction in which the robot cleaner moves, and delivers detection information to the control unit. That is, the front sensor senses a protrusion, home stuff, furniture, a wall surface, a wall corner, etc. that are present in a path through which the robot cleaner moves, and delivers related information to the control unit. The front sensor may be an infrared ray sensor, an ultrasonic sensor, an RF sensor, a geomagnetic sensor, etc. The robot cleaner may use a single type of sensor as the front sensor or use two or more types of sensors together as needed.

The ultrasonic sensor is mostly used for sensing a remote obstacle, generally. The ultrasonic sensor includes a transmission unit and a reception unit. The control unit 200 determines the presence or absence of an obstacle through whether an ultrasonic wave radiated through the transmission unit is reflected from an obstacle and received by the reception unit, and calculates a distance from the obstacle by using a reception time. The ultrasonic sensor may be installed along the front outer circumferential surface of the robot cleaner. The transmission angle of the ultrasonic wave maintains a range of angles that do not affect another signal in order to prevent crosstalk phenomenon. The reception sensitivities of reception units may be set to be different from one another. Also, the ultrasonic sensor may be installed to incline upwards by an angle so that the ultrasonic wave transmitted by the ultrasonic sensor is output upwards. Also, the ultrasonic sensor may further include a blocking member in order to prevent the ultrasonic wave from becoming radiated downwards.

The ultrasonic sensor delivers different output values to the control unit according to the presence or absence of an obstacle or a distance from an obstacle. The range of the output values may be differently set according to the sensing range of the ultrasonic sensor. When an auto-correction mode is executed, the control unit 200 may move the robot cleaner to the front of a preset target by using the ultrasonic sensor.

The second obstacle sensor may be installed on the outer circumferential surface of the robot cleaner with the front sensor. Also, the second obstacle sensor may not be installed along the outer circumferential surface and may be formed to have a surface that protrudes toward the outside of the main body 10 of the robot cleaner. The second obstacle sensor may be an infrared ray sensor, an ultrasonic sensor, an RF sensor, a position sensitive device (PSD) sensor, etc., senses an obstacle that is present at the front or side, and delivers obstacle information to the control unit. That is, the second obstacle sensor senses a protrusion, home stuff, furniture, a wall surface, a wall corner, etc. that are present in a path through which the robot cleaner moves, and delivers related information to the control unit. Also, by using the front sensor or the second obstacle sensor, the robot cleaner may move, maintaining a constant distance from a wall surface. For example, the PSD sensor detects the positions of the short and long distances of an incident light with a single p-n junction by using the surface resistance of a semiconductor. The PSD sensor includes a 1D PSD sensor that detects light on a single axis and a 2D PSD sensor that may detect the position of light on the surface, and they have a pin photodiode structure. The PSD sensor is one of infrared ray sensors, and measures a distance by using a time taken while an obstacle is irradiated with an infrared ray, the obstacle is sensed, and the infrared ray is reflected and returned.

The cliff sensor is referred to also as a Cliff sensor. The cliff sensor mostly uses optical sensors of various types and the present embodiment describes e.g., an infrared ray sensor. The cliff sensor may have a type of infrared ray sensor module that has a light emission unit and a light reception unit, such as the PSD sensor. The cliff sensor may have a reference distance and a sensing range. The cliff sensor may measure a stable measurement value irrespective of a difference in the reflectance of the floor surface or in color and uses triangulation. The cliff sensor is disposed in a recess that is present in the bottom surface of the robot cleaner and has a depth. The cliff sensor may be installed at different positions according to the type of the robot cleaner. The cliff sensor keeps sensing the floor while the robot cleaner moves.

The lower camera sensor is disposed on the rear surface of the robot cleaner and images the lower side, i.e., a floor surface or a surface to be cleaned, on the move. The lower camera sensor is referred to also as an optical flow sensor. The lower camera sensor converts a lower image input from an image sensor in a sensor and generates image data in a form. The generated image data is stored in the storage unit 500. Also, one or more light sources may be installed adjacent to the image sensor. The one or more light sources irradiate a region of the floor surface taken by the image sensor with a light. That is, when the robot cleaner moves a cleaning region along the floor surface, a distance is maintained between the image sensor and the floor surface if the floor surface is flat. On the contrary, when the robot moves the floor surface of a non-uniform surface, the distance becomes farther by the unevenness of the floor surface and an obstacle. In this case, the one or more light sources may be disposed to adjust the amount of light. The light sources include a light emission device capable of adjusting the amount of light, such as a light emitting diode or laser.

The lower camera sensor may detect the position of the robot cleaner irrespective of the slipping of the robot cleaner. The control unit 200 compares and analyzes image data taken by the lower camera sensor over time to calculate a movement distance and movement direction and accordingly calculates the position of the robot cleaner. By observing the lower side of the robot cleaner by using the lower camera sensor, the control unit may perform calibration resistant to slipping on a position calculated by another unit.

The robot cleaner may further include the upper camera sensor that is installed to face upwards or the front to image around the robot cleaner. In the case that the robot cleaner includes a plurality of upper camera sensors, the camera sensors may be disposed at the upper part or side of the robot cleaner at intervals or at angles.

The control unit 200 may extract a characteristic point from image data taken by the upper camera sensor, identify the position of the robot cleaner by using the characteristic point, and make a cleaning map of a cleaning region. The control unit 200 may precisely identify the position by using detection information from an acceleration sensor, a gyro sensor, a wheel sensor, and a lower camera sensor and image data from the upper camera sensor. Also, the control unit 200 may precisely make a cleaning map by using obstacle information detected by a front sensor, a second obstacle sensor, etc. and a position identified by the upper camera sensor.

An operation sensor unit 130 may detect the operation of the robot cleaner. The operation sensor unit 130 includes one or more of an acceleration sensor, a gyro sensor, and a wheel sensor and detects the operation of the robot cleaner.

The acceleration sensor senses a change in speed of the robot cleaner, e.g., a change in speed according to a start, a stop, a direction change, collision with an object, etc. The acceleration sensor may be attached to a position adjacent to a main wheel or a secondary wheel to detect the slipping or idling of the wheel. In this case, it is possible to calculate a speed by using the acceleration detected through the acceleration sensor and check or calibrate the position of the robot cleaner through comparison with an instruction speed. However, in the present embodiments, the acceleration sensor is built in the control unit 200 to sense a change in speed of the robot cleaner itself that appears in a cleaning mode or in a travel mode. That is, the acceleration sensor detects impulse according to a change in speed and outputs a voltage value corresponding thereto. Thus, the acceleration sensor may perform the function of an electronic bumper.

The gyro sensor senses the direction of rotation and detects an angle of rotation when the robot cleaner moves according to an operation mode. The gyro sensor detects the angular speed of the robot cleaner to outputs a voltage value proportional to the angular speed. The control unit 200 uses a voltage value output from the gyro sensor to calculate the direction of rotation and the angle of rotation.

The wheel sensor is connected to left and right main wheels to sense the revolution per minute (RPM) of the main wheels. In this example, the wheel sensor may be a rotary encoder. The rotary encoder senses and outputs the RPM of the left and right main wheels when the robot cleaner moves according to a travel mode or cleaning mode. The control unit may use the RPM to calculate the speed of rotation of the left and right wheels.

The power supply unit 600 includes a rechargeable battery 610 and supplies power to the robot cleaner. The power supply unit 600 supplies actuating power to units, supplies operating power that enables the robot cleaner to move or clean, and moves to a recharging base to receive charging currents when remaining power is insufficient. A battery is connected to a battery sensing unit so that the remaining amount and charged state of the battery is delivered to the control unit. The output unit 400 may display the remaining amount of the battery on the screen by the control unit. The battery may also be disposed at the central lower part of the robot cleaner or may also be disposed at one of right and left sides of the main body so that a dust bin is disposed at the bottom of the main body 10. In the latter case, the robot cleaner may further include a balance weight in order to correct imbalance due to the weight of the battery.

The actuating unit 700 is connected to the left and right main wheels. The actuating unit 700 actuates a wheel motor that rotates wheels to move the robot cleaner. Wheel motors are connected to main wheels, respectively to rotate the main wheels and operate independently from each other. Also, the robot cleaner includes one or more secondary wheels on the rear surface to support the robot cleaner, minimize the friction between the robot cleaner and the floor surface (surface to be cleaned), and facilitate the movement of the robot cleaner.

The cleaning unit 800 includes a dust bin that stores collected dust, a suction fan that provides power to suck up dust from a cleaning region, and a suction motor that rotates the suction fan to suck up the air, and sucks ambient dust or foreign objects. The suction fan may include a plurality of blades and a member that is formed in a ring shape at the upper edges of the plurality of blades to connect the plurality of blades and enable the air flowing into toward the central axis of the suction fan to move in a direction perpendicular to the central axis.

Figure 4:
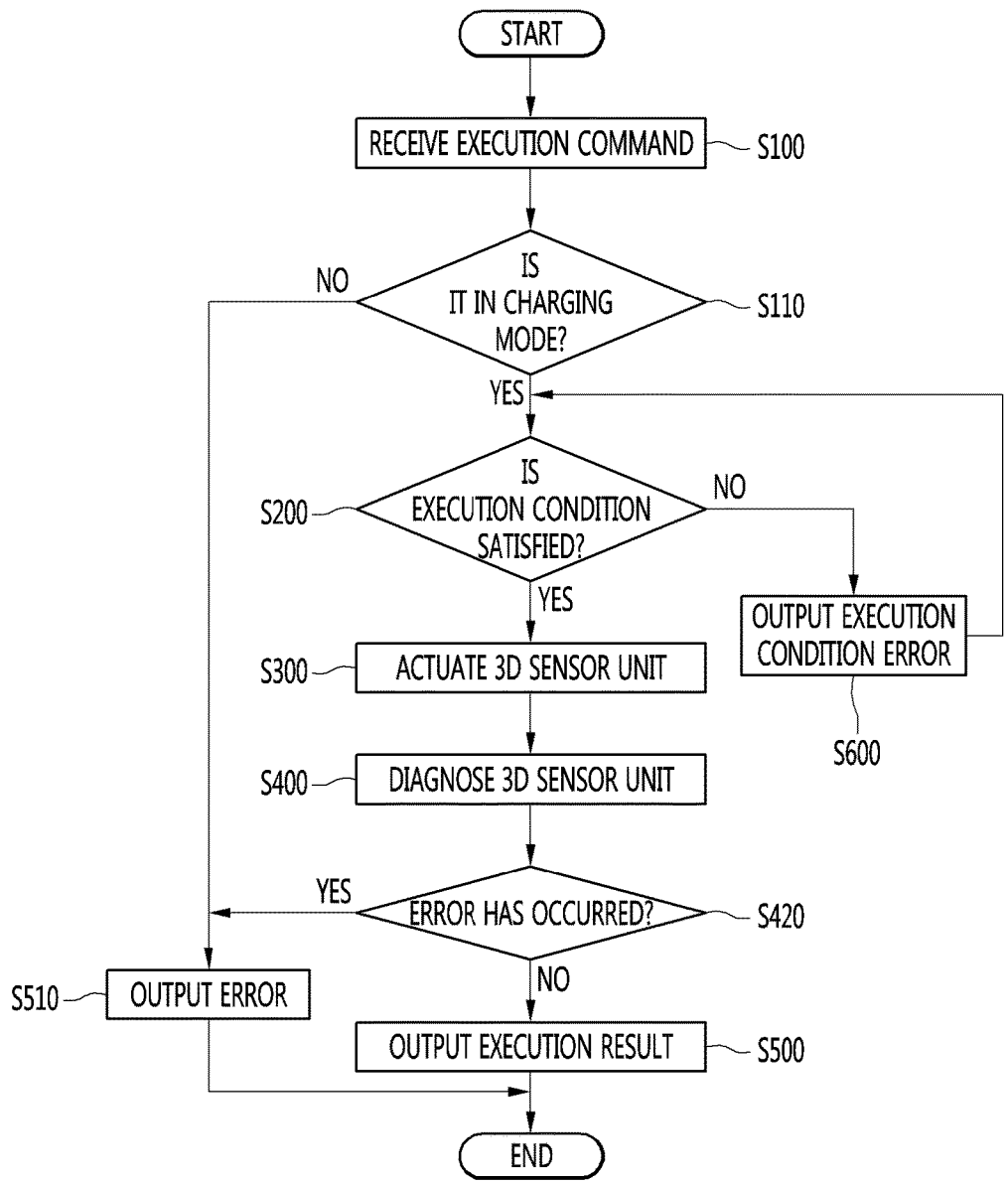
FIG. 4 is a general flowchart of a 3D sensor auto-correction method of a robot cleaner according to an embodiment.
Figure 5:
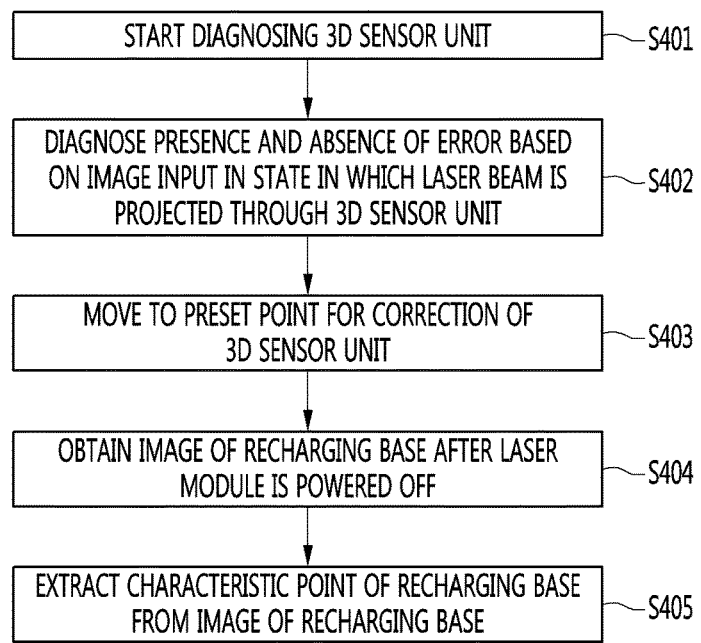
FIGS. 5 to 8 are flowcharts of a 3D sensor auto-correction method of a robot cleaner according to an embodiment.
Figure 6:
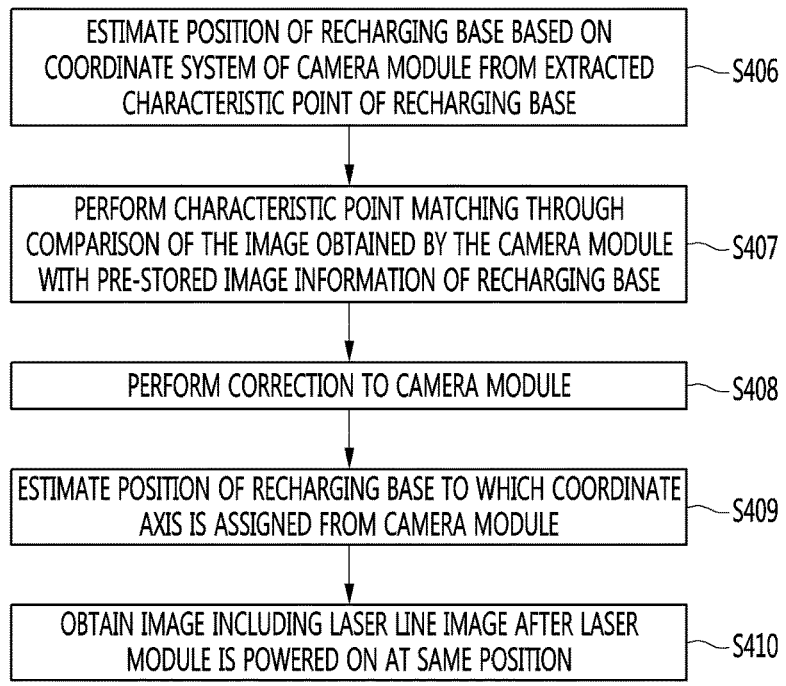
Figure 7:
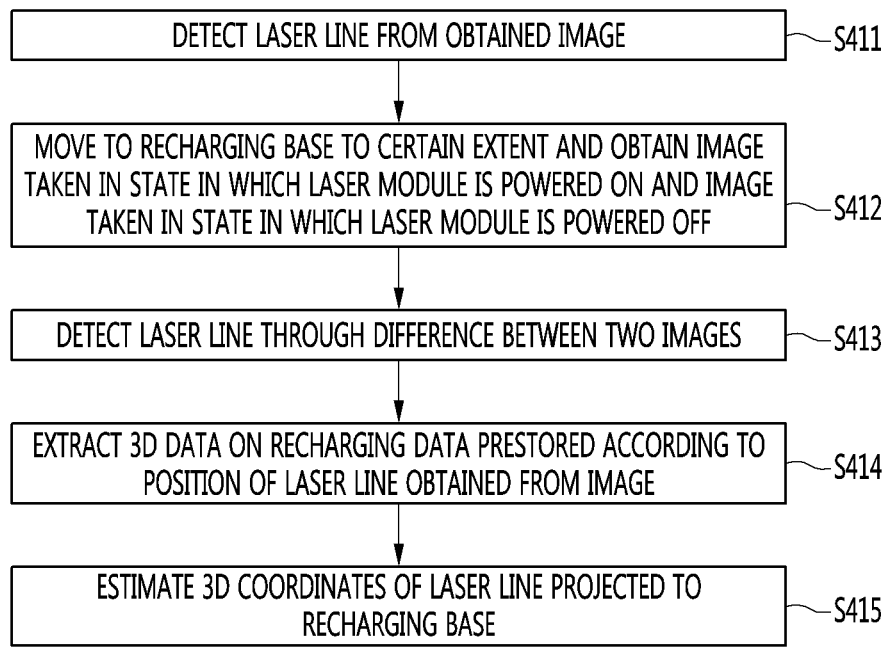
Figure 8:
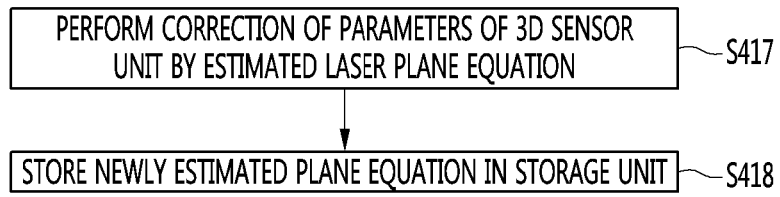

FIG. 4 is a general flowchart of a 3D sensor correction method of a robot cleaner according to an embodiment.

Referring to FIG. 4, when the execution command for a diagnostic mode for the 3D sensor unit 110 among a plurality of operation modes is input in S100, the robot cleaner check one or more preset execution conditions before the execution of the diagnostic mode in step S200.

The plurality of operation modes includes e.g., a diagnostic mode, a charging mode, a cleaning mode, a travel mode, a standby mode, etc. in which case the cleaning mode and the travel mode further include one or more styles or patterns. The execution command for the diagnostic mode is input when one of buttons installed at the upper part of the robot cleaner is pushed, the buttons are pushed in a way or one button is pushed for a time. As another example, the execution command for the diagnostic mode may be input when a control signal is received from a remote control, terminal, etc. by using a built-in sensor or communication unit.

The robot cleaner checks the current operation mode, checks whether reservation cleaning is set, and then actuates the 3D sensor unit 110, in step S300. Then, the robot cleaner uses sensing information output from the 3D sensor unit 110 to diagnose the state of the 3D sensor unit 110 in step S400. The robot cleaner may be pre-programmed to execute the diagnostic mode for the 3D sensor unit 110 only when the current operation mode is a preset mode, e.g., charging mode, in step S110.

When an execution condition is not satisfied, the robot cleaner outputs an error message in step S510 or S600. For example, when the execution condition is not satisfied, the robot cleaner may output a voice message, such as "Check dust bin", "Impossible to enter diagnostic mode due to low battery level", "Impossible to enter diagnostic mode due to attachment of dustcloth plate", etc. or display the message on the screen. Also, when reservation cleaning is set, the robot cleaner provides a message, such as "Reservation has been cancelled for diagnosis. Diagnosis starts." through sound or screen.

When the execution condition is satisfied, the robot cleaner outputs a voice message, such as "Diagnosis of robot cleaner starts", "Be away from robot cleaner and remove objects within 1 m from a recharging base", etc. or displays the message on the screen, and then executes the diagnostic mode for the 3D sensor unit 110 in step S400.

When the execution of the diagnostic mode is completed, the robot cleaner outputs a voice message, such as "Diagnostic mode has been completed" or displays the message on the screen. Also, the robot cleaner provides a result of the execution, such as "No error as result of diagnosis" through sound or screen by using the output unit in step S500. Also, the robot cleaner may further provide a message, such as "Press charging button if you want to hear result of diagnosis again, and press stop button if you want to complete diagnosis". Then, when the cancellation command for the diagnostic mode is input, the robot cleaner outputs a message, such as "Diagnostic mode is cancelled".

When as a result of execution, the execution condition is not satisfied or it is diagnosed during the diagnostic mode that an object sensing unit is in an abnormal state, the robot cleaner outputs an error message by using the output unit in step S510. For example, the robot cleaner outputs an error message, such as "Sensor has error", "Problem has been found", "Charging is not tried", "Retry diagnosis after turning off and then turning on main power switch at lower part of main body", "Wipe sensor window", "Call service center", etc.

As described above, since the robot cleaner and the diagnostic method thereof according to embodiments perform diagnosis and auto-correction on the 3D sensor unit 110 upon initial actuation or according to a user need, the malfunction or breakdown of the robot cleaner is prevented. Also, embodiments diagnose the state of an object sensing unit by using the sensing signal of the object sensing unit in the main body upon initial actuation or according to a user need. Thus, embodiments prevent an accident or error that may occur in the future as the robot cleaner operates.

FIGS. 5 to 8 are flowcharts of a 3D sensor automatic auto-correction method of a robot cleaner according to an embodiment.

Referring to FIGS. 5 to 8, the control unit 200 starts diagnosing the 3D sensor unit 110 in step S401. Performing diagnosis refers to checking whether the 3D sensor unit 110 has an error to be corrected. The error to be corrected means an error that needs correction. When there is the error to be corrected, there is a need to calibrate the error to be corrected. The control unit 200 diagnoses the presence or absence of the error to be corrected based on an image input in a state that a laser beam is projected through the 3D, in step S402.

FIGS. 9a to 9d are diagrams that show images obtained by a 3D sensor unit in order to perform a 3D sensor auto-correction method of a robot cleaner according to an embodiment.

Figure 9:
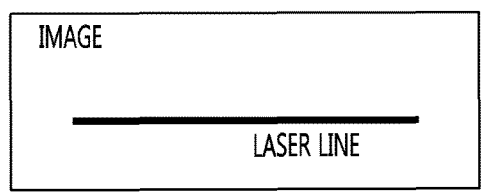
FIGS. 9a to 9d are diagrams that show images obtained by a 3D sensor unit in order to perform a 3D sensor auto-correction method of a robot cleaner according to an embodiment.
Figure 9:
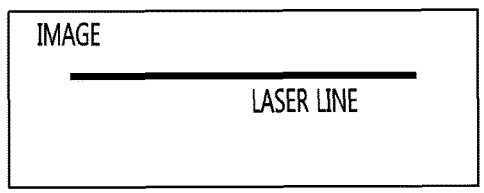
Figure 9:
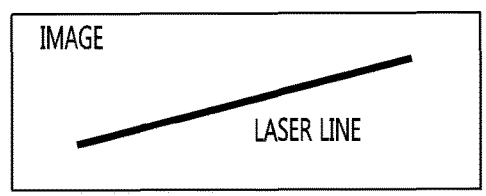
Figure 9:
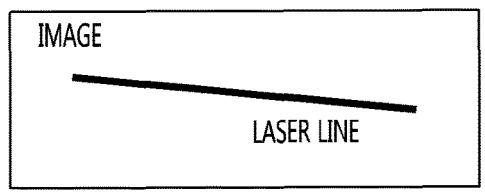

Referring to FIGS. 9a to 9d, FIG. 9a is an image that does not have an error to be corrected, and FIGS. 9b to 9d are images that have errors to be corrected. In this example, these images are front images taken by the 3D sensor unit 110. Since the 3D sensor unit 110 is installed at the main body 10 of the robot cleaner to face the front and to be capable of imaging while slightly inclining toward the floor, an image obtained by the 3D sensor unit 110 is an image of the floor surface when there is no obstacle within a distance, e.g., 30 cm, for example. The image includes a laser line image.

That is, in the image taken by the 3D sensor unit 110, the laser line should horizontally exit at a preset position when there is no error to be corrected as shown in FIG. 9a. However, images in FIGS. 9b to 9d indicate cases where the 3D sensor unit 110 has errors to be corrected due to a physical impact or mechanical combination, and it may be seen from the images obtained by the 3D sensor unit 110 that the laser line image in the images get out of a designated position. That is, it may be seen from the image in FIG. 9b that a laser line is disposed at an upper point than a preset point. It may be seen from the image in FIG. 9c that a laser line inclines to have a lower left point than a preset point. It may be seen from the image in FIG. 9d that a laser line inclines to have a lower right point than a preset point.

When it is determined that the image taken by the 3D sensor unit 110 is not the image in FIG. 9a but the images in FIGS. 9b to 9d, the control unit 200 determines that the error to be corrected has occurred and performs an auto-correction procedure.

Thus, the control unit 200 moves the robot cleaner to a preset point for auto-correction in step S403. In this step, a procedure for moving the robot cleaner to the place where a recharging base is positioned is performed.

The control unit 200 moves the robot cleaner to the recharging base based on map information that is stored in the storage unit 500. The control unit 200 approximately discerns the positions of the robot cleaner and the recharging base through the secondary object sensing unit 120. Thus, the control unit 200 uses the secondary object sensing unit 120 to determine the position of the robot cleaner and move the robot cleaner to the recharging base for auto-correction.

Shape information on the recharging base is stored in the storage unit 500 of the robot cleaner before the launch of the robot cleaner. In this example, the shape information may include the size and appearance of the recharging base in a space.

Figure 10:
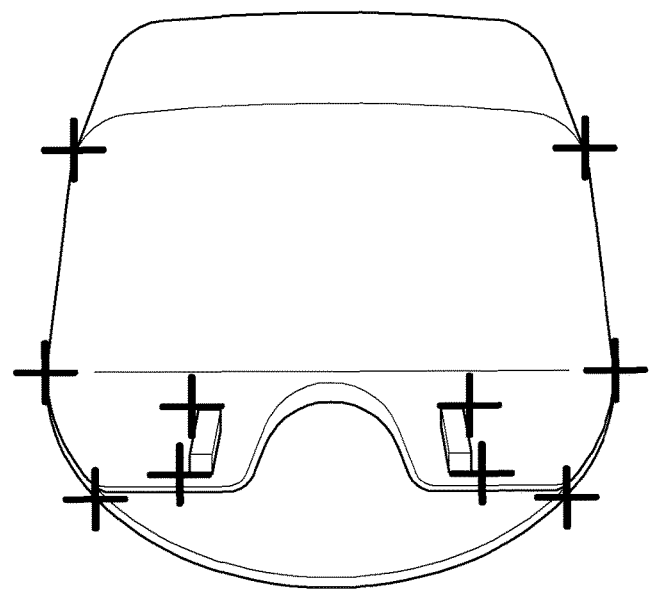
FIG. 10 is a diagram that shows an image of a recharging base obtained through a camera module after a laser module in a robot cleaner according to an embodiment is powered off.

Referring to FIG. 10, the 3D sensor unit 110 turns off the power of the laser module 110b and then obtains an image of the recharging base through the camera module 110a in step S404.

The 3D sensor unit 110 delivers the obtained image of the recharging base to the control unit 200. Thus, the control unit 200 extracts a characteristic point of the recharging base from the image of the recharging base in step S405.

The 3D sensor unit 110 turns on the power of the laser module 110b when the camera module 110a takes an image for 3D data acquisition, or always turns on the power of the laser module 110b to take an image. The images obtained by the camera module 110a include the image of the recharging base and include a laser line image which the recharging base is irradiated.

When the camera module 110a obtains an image in a state in which the laser module 110b is powered on, an error may occur due to a laser line irradiated to the recharging base when the characteristic point is extracted. For example, when the corner portion of the recharging base is used as a characteristic point, an undesirable characteristic point may be extracted due to the laser line, so the image of the recharging base is obtained in a state in which the laser module 110b is powered off and a characteristic point is extracted from the image. Since the characteristic point is extracted by using various methods, related descriptions are not provided herein.

In step S406, the control unit 200 clearly estimates the position of the recharging base based on the coordinate system of the camera module 110a from the characteristic point of the recharging base that is extracted based on the image obtained by the camera module 110a in a state in which the laser module 110b is powered off.

When the characteristic point is extracted from the image, the control unit 200 performs characteristic point matching through comparison of the image obtained by the camera module 110a with image information on the recharging base pre-stored in the storage unit 500, in step S407. That is, characteristic points in the image information on the recharging base pre-stored in the storage unit 500 is 3D coordinate points that are registered based on a world coordinate system. Thus, it is possible to estimate correspondence between a 2D coordinate value in an image and a 3D coordinate value in a space and it is possible to perform auto-correction to the camera module 110a, in step S408. When auto-correction to the control unit 200 is completed, the control unit 200 may clearly estimate the position of the recharging base to which a coordinate axis has been assigned from the camera module 110a, in step S409. Through these processes, the control unit 200 positions the robot cleaner at a preset point for the auto-correction of the robot cleaner.

Then, the control unit 200 turns on the power of the laser module 110b at the same position and then uses the camera module 110a to obtain an image that includes a laser line image, in step S410. The control unit 200 detects the laser line in the recharging base from the obtained image in step S411.

Figure 11:
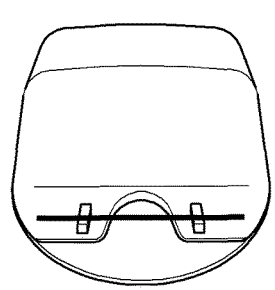
FIGS. 11a to 11c are diagrams that show images taken while a laser module in a robot cleaner according to an embodiment is powered on, and an image taken while the laser module is powered off, and a laser line image.
Figure 11:
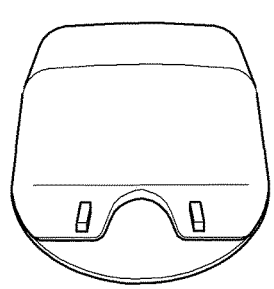
Figure 11:
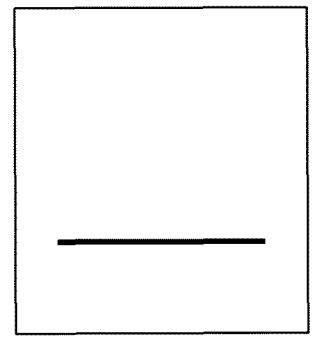

Referring to FIGS. 11a to 11c, when a difference between an image taken in a state in which the laser module 110b is powered on as shown in FIG. 11a and an image taken in a state in which the laser module is powered off as shown in FIG. 11b is calculated by the control unit 200, only a laser line image only exists and noise may be removed as shown in FIG. 11c. When the noise is removed, it is possible to easily detect the laser line by using various methods.

Figure 12:
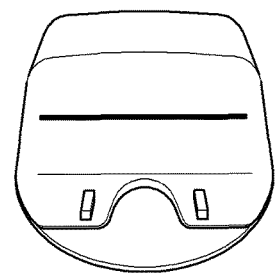
FIGS. 12a to 12c are diagrams that show images taken while a laser module in a robot cleaner according to an embodiment is powered on, and an image taken while the laser module is powered off, and a laser line image.
Figure 12:
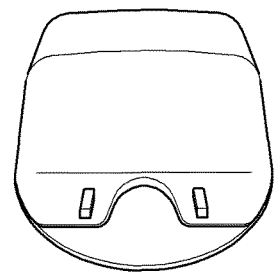
Figure 12:
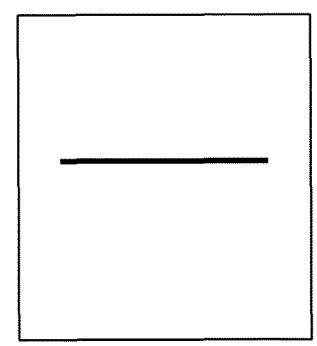

Referring to FIGS. 12a to 12c, the control unit 200 moves and then stops the robot cleaner to the recharging base to a predetermined distance, and obtains an image taken in a state in which the laser module 110b is powered on as shown in FIG. 12a and an image taken in a state in which the laser module is powered off as shown in FIG. 12b, in step S412. Then, a laser line is detected through a difference between two images as shown in FIG. 12c, in step S413.

The control unit 200 extracts 3D data on the recharging base pre-stored in the storage unit 500 according to the positions of laser lines obtained from four images, in step S414. In addition, the control unit 200 may use the 3D data on the recharging base to estimate a 3D coordinate of a laser line projected to the recharging base, in step S415. The control unit 200 may estimate the equation of a laser plane from the estimated 3D coordinate of the laser line in step S416. The control unit 200 performs a correction of parameters of the 3D sensor unit 110 by the estimated laser plane equation in step S417. The control unit 200 changes and stores a plane equation pre-stored in the storage unit 500 to a newly estimated plane equation in step S418.

Although particular embodiments have been described above, many variations may also be implemented without departing from the scope of the present disclosure. Therefore, the scope of the present disclosure should not be limited to the above-described embodiments but should be defined by equivalents to the following claims as well as the following claims.

The invention claimed is:

1. A robot cleaner comprising:
a 3D sensor installed on a main body to sense nearby objects and output sensing information;
a secondary sensor configured to sense nearby objects and output sensing information;
a memory configured to set a diagnostic algorithm according to a diagnostic mode in advance;
an input interface configured to input an execution command for the diagnostic mode;
a controller configured to execute the diagnostic mode for the 3D sensor and auto-correct a parameter of the 3D sensor using the diagnostic algorithm in response to the execution command; and
an output interface configured to output an execution result of the diagnostic mode or a correction message, wherein the controller is configured to capture a recharging base, position the robot cleaner at a preset point by performing characteristic point matching on the captured recharging base, obtain an image including a laser line at the preset point, and correct the parameter of the 3D sensor based on the laser line displayed on the recharging base.

2. The robot cleaner according to claim 1, wherein the 3D sensor comprises a laser module that irradiates a target with a laser pattern, and a camera module that obtains an image including the laser pattern.

3. The robot cleaner according to claim 1, wherein the controller is configured to move the robot cleaner to the preset point to perform correction based on the sensing information from the secondary sensor when as a result of a diagnosis execution of the 3D sensor, there is need to correct the parameter of the 3D sensor.

4. The robot cleaner according to claim 1, wherein the secondary sensor comprises one or more of an obstacle sensor that signalizes a sensing signal and senses a front obstacle based on a reflected and received signal, a cliff sensor that transmits a sensing signal to a floor surface and senses a cliff based on a reflected and received signal, and a lower camera sensor that takes an image on the floor surface to output image data.

5. The robot cleaner according to claim 1, further comprising:
a power supply installed at a lower part of the main body and including a rechargeable battery to supply actuating power;
an actuator configured to actuate left and right main wheels provided at opposite sides of a lower part of the main body to move the robot cleaner; and
a cleaner installed at the lower part of the main body and configured to suck up filth or dust from the floor surface or in air.

6. The robot cleaner according to claim 1, wherein the controller is configured to extract the laser line in the image that is obtained in a state in which a laser beam is projected through the 3D sensor, and diagnose presence or absence of an error to be corrected.

7. The robot cleaner according to claim 6, wherein it is determined that there is the error to be corrected, when the laser line in the image obtained by the 3D sensor gets out of a designated position.

8. The robot cleaner according to claim 1, wherein in order to perform the characteristic point matching of the recharging base, the controller obtains an image of the recharging base through a camera module after a laser module is powered off, extracts the characteristic point of the recharging base from the image of the recharging base, and compares the extracted characteristic point of the recharging base with pre-stored image information on the recharging base to perform the characteristic point matching.

9. The robot cleaner according to claim 1, wherein in order to perform the correction of the parameter of the 3D sensor, the controller extracts pre-stored 3D data on the recharging base according to a position of the laser line obtained from the image, estimates 3D coordinates of the laser line projected to the recharging base based on the extracted 3D data on the recharging base, estimates a laser plane equation from the estimated 3D coordinates of the laser line, and performs correction to the parameter of the 3D sensor by using the estimated laser plane equation.

10. A method of automatically correcting a 3D sensor of a robot cleaner, the method comprising:
sensing, by the 3D sensor installed on a main body, nearby objects and outputting sensing information;
sensing, by a secondary sensor, nearby objects and outputting sensing information;
receiving an execution command for a diagnostic mode;
executing the diagnostic mode for the 3D sensor and auto-correcting a parameter of the 3D sensor using a diagnostic algorithm that is preset in order to execute the diagnostic mode, in response to the execution command; and
outputting an execution result of the diagnostic mode or a correction message,
wherein the auto-correcting the parameter of the 3D sensor comprises:
capturing a recharging base;
performing characteristic point matching on the captured recharging base;
positioning the robot cleaner at a preset point using a performance result of the characteristic point matching;
obtaining an image including a laser line at the preset point; and
correcting the parameter of the 3D sensor based on the laser line displayed on the recharging base.

11. The method according to claim 10, wherein the performing the characteristic point matching on the captured recharging base comprises:
obtaining an image of the recharging base through a camera module after a laser module is powered off;
extracting the characteristic point of the recharging base from the image of the recharging base; and
comparing the extracted characteristic point of the recharging base with pre-stored image information on the recharging base to perform the characteristic point matching.

12. The method according to claim 10,
wherein the obtaining the image including a laser line at the preset point comprises:
using a camera module to obtain the image including a laser line image after a laser module is powered on, and detecting the laser line existing in the recharging base from the obtained image; and
moving the robot cleaner and then stopping the robot cleaner at a predetermined distance from the recharging base, and obtaining an image taken in a state in which the laser module is powered on and an image taken in a state in which the laser module is powered off to detect the laser line through a difference between two images,
wherein the correcting the parameter of the 3D sensor comprises estimating 3D coordinates of the laser line projected to the recharging base from the detected laser line to perform correction on the parameter of the 3D sensor.

13. The method according to claim 12, wherein the detecting of the laser line comprises calculating a difference between an image taken in a state in which the laser module is powered on and an image taken in a state in which the laser module is powered off, to detect the laser line.

14. The method according to claim 12, wherein the performing of the correction on the parameter of the 3D sensor comprises:
extracting pre-stored 3D data on the recharging base according to a position of the laser line obtained from the image;
estimating 3D coordinates of the laser line projected to the recharging base based on the extracted 3D data on the recharging base;
estimating a laser plane equation from the estimated 3D coordinates of the laser line; and
performing correction on the parameter of the 3D sensor by using the estimated laser plane equation.

* * * * *